Nov. 16, 1971  R. KLEIN  3,620,014
AUTOMATIC DOOR ACTUATOR
Filed July 7, 1969  9 Sheets-Sheet 1

INVENTOR:
RICHARD KLEIN
BY
ATT'YS

Nov. 16, 1971  R. KLEIN  3,620,014
AUTOMATIC DOOR ACTUATOR
Filed July 7, 1969  9 Sheets-Sheet 5

INVENTOR:
RICHARD KLEIN
BY
Mason, Kolehmainen, Rathburn & Wyss
ATT'YS

Nov. 16, 1971  R. KLEIN  3,620,014
AUTOMATIC DOOR ACTUATOR
Filed July 7, 1969  9 Sheets-Sheet 5

INVENTOR.
RICHARD KLEIN

Nov. 16, 1971   R. KLEIN   3,620,014
AUTOMATIC DOOR ACTUATOR
Filed July 7, 1969   9 Sheets-Sheet 8

INVENTOR:
RICHARD KLEIN

United States Patent Office 3,620,014
Patented Nov. 16, 1971

3,620,014
AUTOMATIC DOOR ACTUATOR
Richard Klein, San Lorenzo, Calif., assignor to American Metal Climax, Inc., New York, N.Y.
Filed July 7, 1969, Ser. No. 839,375
Int. Cl. F15b 15/18
U.S. Cl. 60—51
11 Claims

ABSTRACT OF THE DISCLOSURE

There is provided an electro-hydraulic door actuator including an electrical control module, a power pack, and a door actuator. The power pack includes a fully submerged motor pumping fluid under high pressure into an accumulator or reservoir. The motor operates in response to the pressure demand for fluid within the accumulator. A control valve assembly responsive to signals from the electrical control module controls the flow of high pressure fluid, and the return thereof, from the door actuator. The door actuator includes a pair of pistons operable within respective cylinders, and driving a rack connected to a pinion on the spindle of the door. When the electrical control module calls for a power opening cycle, a spool valve opens a port allowing high pressure fluid to drive one of the pistons in the door opening direction. The door actuator is also ported for a manual operation, in the normal power opening direction, and a panic opening, which would be in the opposite direction from the power opening cycle. The actuator can be readily modified from a right hand actuator to a left hand actuator by the mere reversal of a manifold plate which alters the connection of various ports within the actuator assembly.

---

The present invention relates to an automatic door opener, and particularly to the type of door opener suitable for use in stores and other places of heavy traffic flow.

Automatic door operates are in common use in many public places such as a supermarkets and various public buildings. Conventionally such door operators include a means for sensing the approach and departure of a person relative to the doorway. The senser in turn provides a signal first for the power operation or opening of the door upon the approach of a person, and thereafter by removal of the signal to provide for the closing of the door. Thus it is necessary that the door operator be operable through a power opening cycle, and thereafter to close in a normal closing cycle. However safety requirements also require the so called panic opening of the door. Panic opening as herein used means the opening of the door in the opposite direction from the normal power opening thereof. Normally such panic opening would permit the door to be opened outwardly in the event that a catastrophy such as a fire were to occur, and a crowd were to push against the door. In addition it is desirable that the door be operable manually in the event of power failure or otherwise if the door operator were inoperative.

A common type of door closer is of the electrohydraulic type. More specifically the door actuator controlling the opening and closing of the door is controlled hydraulically; however pressurized fluid for the hydraulic control is provided electrically.

In the installation of door operators it is sometimes necessary to provide for a right hand operation of the door, and at other times it may be necessary to provide for the left hand operation of the door. Thus commercially available door operators are provided for left hand and for right hand operation of the doors.

Accordingly it is an object of the present invention to provide a new and improved door operator.

A further object of the present invention is to provide a new and improved power pack for supplying pressurized fluid to a door actuator.

Yet a further object of the present invention is to provide a new and improved hydraulic door actuator.

Still another object of the present invention is to provide a door actuator which may selectively be operated for left hand or right hand operation of a door.

Further objects and advantages of the present invention will become apparent as the following description proceeds and the features of novelty which characterize the invention will be pointed out with particularity in the claims annexed to and forming a part of this specification.

In accordance with these and other objects, there is provided an automatic door operator having an improved power pack connected to an improved door actuator. The power pack includes a fluid sump for returning fluid and an accumulator for supplying high pressure fluid. An electrically driven pump is submerged within the sump so that no moving parts of the pump extend externally of the sealed power pack housing. Control means are provided responsive to the demand in the accumulator for controlling the operation of the pump independently of the requirement of the actuator.

The present invention is also directed to an improved actuator of the type having first and second pistons movable in first and second hydraulic cylinders, with suitable ports in the cylinder walls and passageways connecting therewith to provide for the desired operation of the actuator. The pistons are connected with a door spindle so that each of the pistons moves in opposite directions within its respective cylinder.

In accordance with another feature of the present invention, the door actuator is readily set for right hand or left hand operation by the mere reversal of a manifold plate which controls the programming of the fluid with reference to the passageways and ports.

For a better understanding of the present invention, reference may be had to the accompanying drawings wherein.

Figure 1:
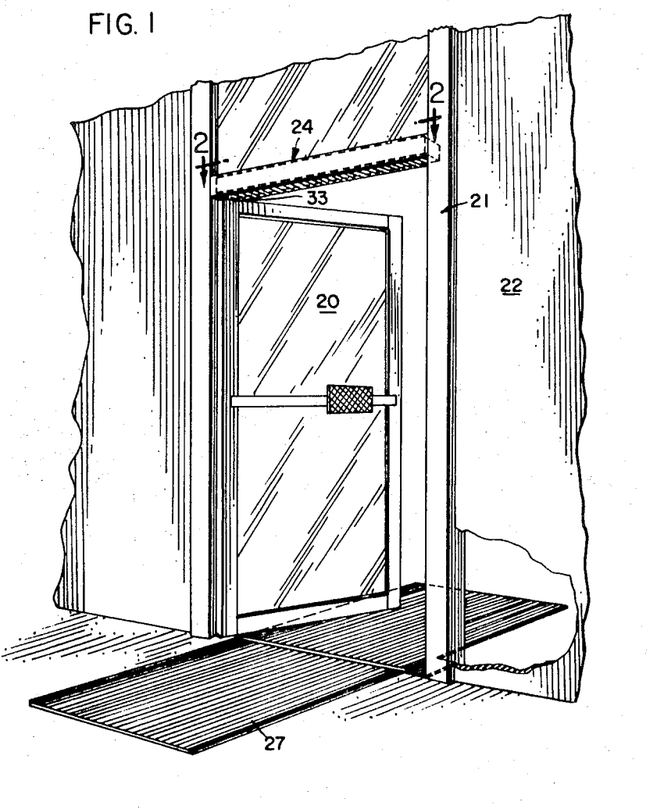
FIG. 1 is a perspective view of a doorway incorporating a door operator according to the present invention.

Referring now to the drawings, and particularly to FIG. 1 thereof, there is illustrated a typical door arrangement for a single door in a building, which door is controlled by a door operator according to the present invention. More specifically there is illustrated a door 20 mounted within a door frame 21 of a building 22. The door frame 21 includes a hollow upper transom member 24 which houses a door operator 25 (FIG. 2) according to the present invention. The door operator 25 is controlled by a suitable signal responsive to the approach and departure of a person, and in the illustrated embodiment is controlled by a known type of electrical floor mat 27 which senses both the approach and departure of a person desiring to pass through the door 20.

Figure 2:
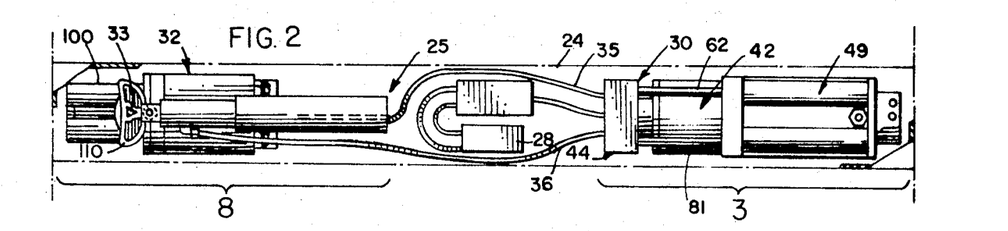
FIG. 2 is a cross sectional view of the doorway of FIG. 1, taken along line 2—2 of FIG. 1, and illustrating in plan view the improved door operator.
Figure 3:
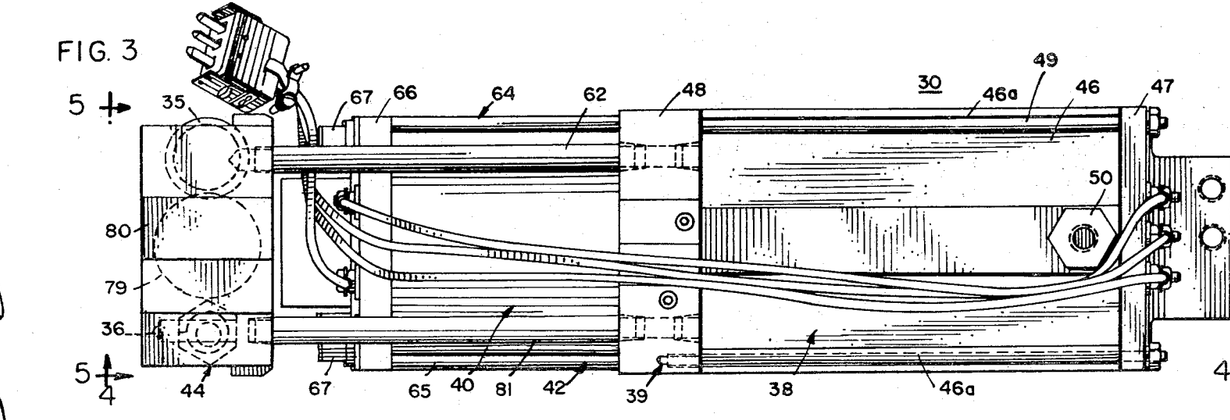
FIG. 3 is a plan view of the power pack of the improved door operator.
Figure 4:
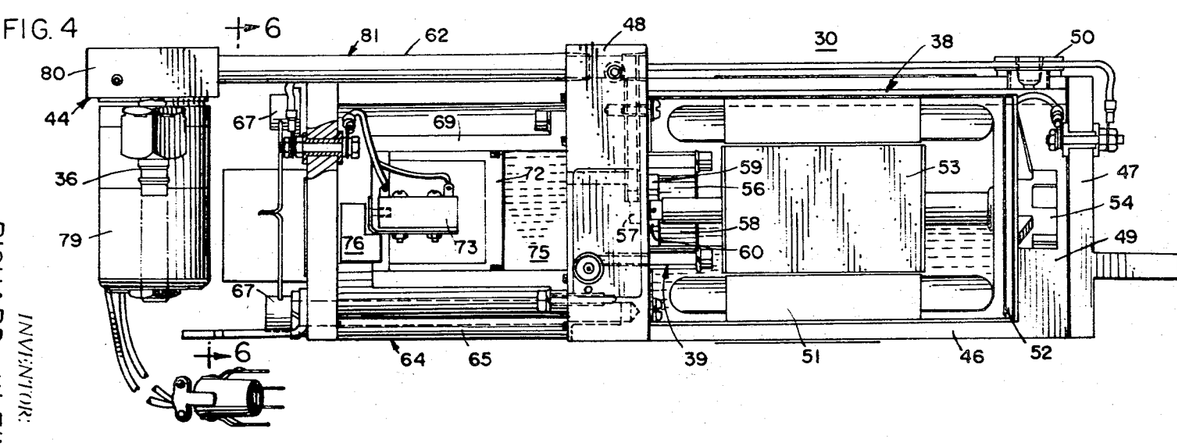
FIG. 4 is an elevational view, partly in cross section, of the improved power pack of FIG. 3.
Figure 5:
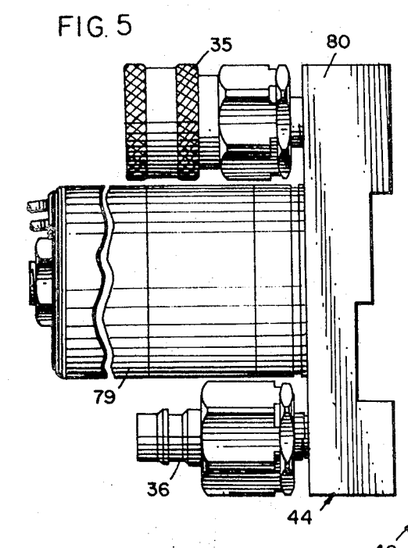
FIG. 5 is an end view of the improved power pack of FIG. 3.
Figure 6:
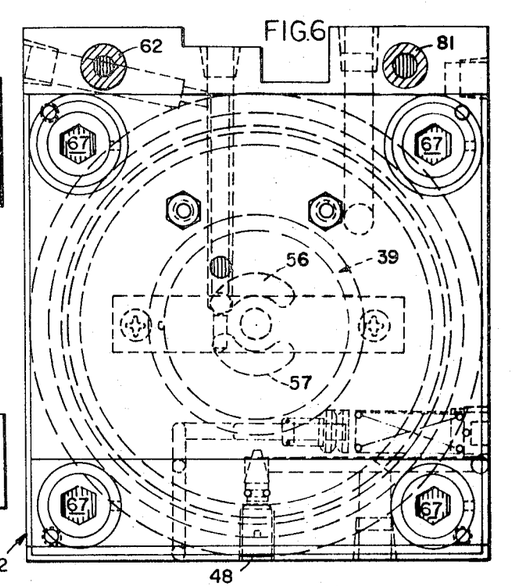
FIG. 6 is a cross sectional view of the power pack of FIG. 3, taken along 6—6 of FIG. 4.
Figure 7:
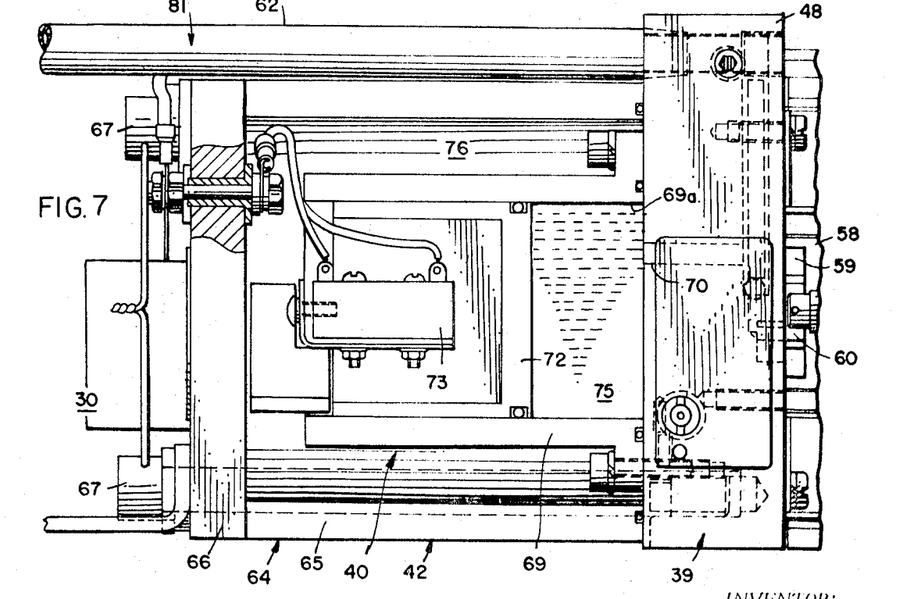
FIG. 7 is an enlarged cross sectional view of the accumulator of the power pack of FIG. 3.
Figures 8, 9:
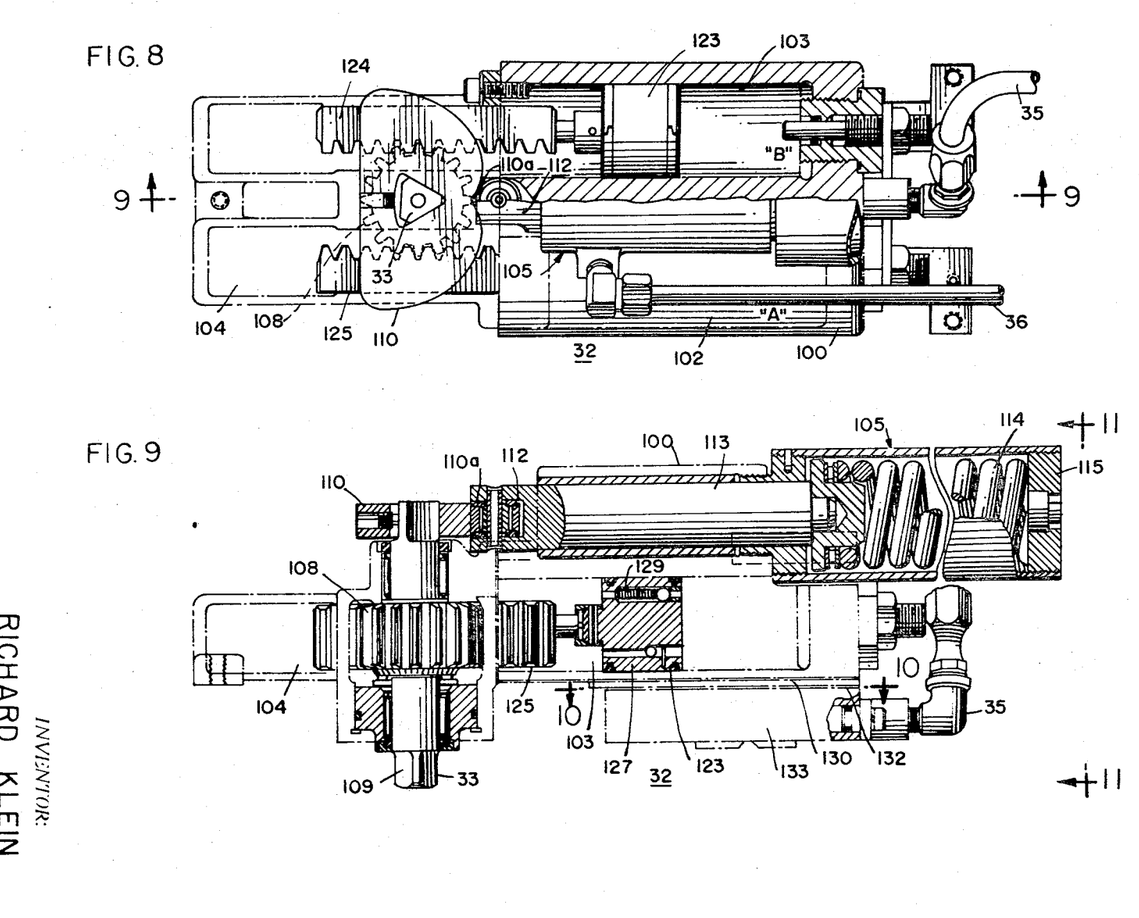
FIG. 8 is a plan view of the improved door actuator, partly in broken away section.
FIG. 9 is a cross sectional view of the improved door actuator of FIG. 8, taken along line 9—9 of FIG. 8.

The door operator 25 according to the present invention includes an electrical control module 28 of a known type, connected to receive a suitable signal from the floor mat 27 and controlling the operation of a power pack 30. A door actuator 32 having a spindle 33 is connected to the power pack by suitable fluid lines and controls the opening and closing of the door 20. The door actuator 32 is connected to the power pack 30 by means of a high pressure line 35 and a return line 36.

POWER PACK

The power pack is best illustrated in FIGS. 3 through 7. As therein illustrated, the power pack includes an electric motor assembly 38, a pump assembly 39, and an accumulator or reservoir 40 within a housing 42. Moreover the power pack 30 additionally includes a control valve 44 responsive to a signal from the electrical control module 28 to supply high pressure oil to the actuator when called for by the electric control module 28.

Referring now to the motor assembly 38, the motor assembly 38 is enclosed within the housing 49 which may conveniently be formed of a hollow extruded tubular portion 46, a first end portion 47, and a second end portion 48, forming a part of the pump assembly 39. The tubular portion 46 is held by suitable tie bolts 46a (FIG. 3) between the end portions 47 and 48 to provide a motor chamber 49. A fill plug 50 is provided for filling or replacing oil to the chamber 49.

Within the chamber 49 is contained the motor assembly 38, and in the illustrated embodiment includes a stator 51 secured within a motor housing 52. A rotor 53 has one end supported within a bearing 54 in an end bell of the motor housing 52, and has the other end thereof fastened to drive the pump assembly 39.

The pump assembly may be of any suitable type, and, in the illustrated embodiment it was found that a gear type pump works satisfactorily. Such a pump has a fluid inlet 56, and a fluid outlet 57 within a pump casing 58. The pump casing has an internally toothed gear ring 59 and a cooperating toothed rotor 60 driven by the rotor 53 of the motor assembly 38. The pump assembly 39 further includes a pump valve block defined by the end portion 48 containing suitable valving to permit flow of pressurized fluid from the fluid outlet 57 either directly to a high pressure line 62 or to the accumulator assembly 40, and to permit the return of high pressure fluid from the accumulator assembly 40 to the high pressure line 62 as called for by the requirements of the actuator.

The accumulator assembly 40 includes a sealed pressure housing 64 including a cylindrical shell 65 closed at one end by an end cover 66 and closed at its other end against the end portion 48. The shell 65, end cover 66 and end portion 48 are held together in any suitable manner as by the bolts 67.

Within the pressure housing 64 is contained a cylinder 69, one end 69a which is in communication with a passageway 70 communicating with the pump through the valve block 48. The other end of the cylinder 69 is open. A piston 72 is contained within the cylinder 69, and is of generally inverted cup shape. A switch 73 is positioned to be actuated by the piston 72 as it moves toward the open end of the cylinder 69. The piston 72 serves to divide the volume within the sealed pressure housing 64 into two chambers, an expandable fluid chamber 75 defined by the cylinder 69, the piston 72, and the end portion 48 defining the pump valve block, and containing high pressure actuating fluid; and a second or gas chamber 76 for a compressible substance which conveniently can be nitrogen.

The control valve assembly 44 includes an electric solenoid 79 controlling a valve mechanism within a valve 80. The valve 80 is effective, in response to actuation of the solenoid 79, to supply high pressure actuating fluid to the high pressure line 35 from the high pressure line 62, and upon signal from the solenoid, to permit return of spent or low pressure actuating fluid from the return line 36 through a second return line 81 and into the pump valve block 48 to be returned into the chamber 49 surrounding the motor where it can be repressurized and pumped through the system as required.

POWER PACK OPERATION

From the above brief description the operation of the power pack is believed clear. However, briefly, it will be understood that supply of high pressure fluid from the power pack to the door actuator 32 in response to a signal from the electrical control module 28 is under the control of the control valve assembly 44. The solenoid 79 responds to the signal from the control module 28 so as to open the valve 80 to supply high pressure fluid to the actuator, or to close the valve 80 and permit the return of used or spent fluid from the actuator. The motor assembly, pump assembly, and accumulator assembly function independently of the demand placed on the system by the electrical control module to the solenoid 79. Thus the electric motor assembly 38 is effective to drive the pump assembly 39 so as to build up pressurized fluid into the fluid chamber 75, moving the piston 72 to the left as viewed in FIG. 4, until the piston actuates the switch 73. At this time the switch 73 will shut off the motor assembly 38. When pressurized fluid is called for by the actuator, the pressurized fluid will first be supplied from the accumulator, namely from the chamber 75, through the expansion of the expandable material within the gas chamber 76 acting against the piston 72. However as soon as the piston 72 moves sufficiently far to the right, as viewed in FIGS. 4 and 7, the switch 73 will once again be actuated and call for the motor assembly 38 to supply additional pressurized fluid to the system. The motor assembly 38 will now drive the pump assembly 39, and will supply pressurized fluid to the accumulator, or directly to the high pressure lines to be used in the actuator. Thus it is understood that the control valve assembly 44 is responsive to a suitable signal received from the electrical control module, which in turn receives a signal from the senser such as the mat 27. The motor and pump assembly operate independently of direct connection with the electrical control module, the motor assembly 38 responding to a discharge of fluid from the accumulator assembly 40.

In a particular embodiment of the present invention it was found that high pressure fluid supplied at 800 p.s.i.

performs satisfactorily. Under such conditions relief valve limits were provided to prevent buildup of pressure in excess of 1500 p.s.i. in the event that the motor assembly failed to shut down at the proper time.

Advantageously all moving parts of the motor assembly 38 and the pump assembly 39 are within the hydraulic fluid system so that no oil leaks to the outside can occur around the moving shafts and the like.

ACTUATOR STRUCTURE

The physical construction of the actuator structure is best illustrated in FIGS. 8 through 14. Referring now to these figures, it will be seen that the arrangement employs a pair of pistons movable in reverse directions through respective cylinders operating through a gear and rack arrangement on the door spindle 33. In addition there is provided spring means for returning the door to its closed position, operating through a closing cam.

Referring now specifically to the drawings, the actuator 32 includes an actuator housing assembly 100 defining a pair of hydraulic cylinders 102 and 103 that open into a gear case 104. For convenience, one side of the actuator is identified as "A" and the other side is identified as "B." Parallel to the hydraulic cylinders 102 and 103 is a spring return assembly 105.

To provide for the control of the door, there is provided the spindle 33 extending through the gear case 104, containing a pinion gear 108 within the gear case, and having a square Kelly type drive 109 at its lower end to cooperate with a square Kelly in the door. The shaft 33 also extends through the upper end of the gear case 104, and carries a heart-shaped door closing cam 110. The cam is symmetrical, with a depression 110a to provide for spring latching of the door in a closed position. The spring return assembly includes a cam follower 112 connected to one end of a piston 113 (FIG. 9) and biased against the cam 110 by a door closing spring 114. Opening of the door in either direction will cause the cam follower 112 to rise on the lobe of the cam 110 thus further compressing the spring 114. When the force opening the door is released, the energy stored in the spring 114 will act against the respective lobe of the cam 110 to provide for controlled closing of the door. It will be understood that the operation of the door closing arrangement is identical, whether the door be opened to the left or to the right. An adjustable plug 115 is provided for adjusting the compressive load on the spring 114.

To provide for the control of the door functions, each of the cylinders 102 and 103 slideably receives a corresponding piston 122 and 123. Each of the pistons 122 and 123 is secured to a gear rack 124 and 125 drivingly engaging the pinion gear 108. Thus it will be understood that the pistons 122 and 123 move simultaneously and in opposite directions. Moreover each of the pistons 122 and 123 contains a check valve 126 and 127 which permits unrestricted flow of fluid from the gear end of the respective cylinder to the opposite end thereof, but prevents or checks the movement of fluid in the reverse direction. In addition each of the pistons 122 and 123 contains a spring biased pressure relief or safety valve 129 which permits the return of fluid in the opposite direction if the pressure differential builds up across the piston beyond a predetermined load.

To provide for the control of fluid to and from the respective cylinders 102 and 103, there is provided a plurality of ports in the respective cylinders opening onto a port surface 130 formed in the housing assembly 100. It will be noticed that the ports communicating with each of the cylinders 102 and 103 are identical, and a manifold plate 132 is provided for connecting various ones of the ports. In addition a valve block 133 is provided for controlling some of the functions of the actuator 32.

Figures 10, 11, 12:
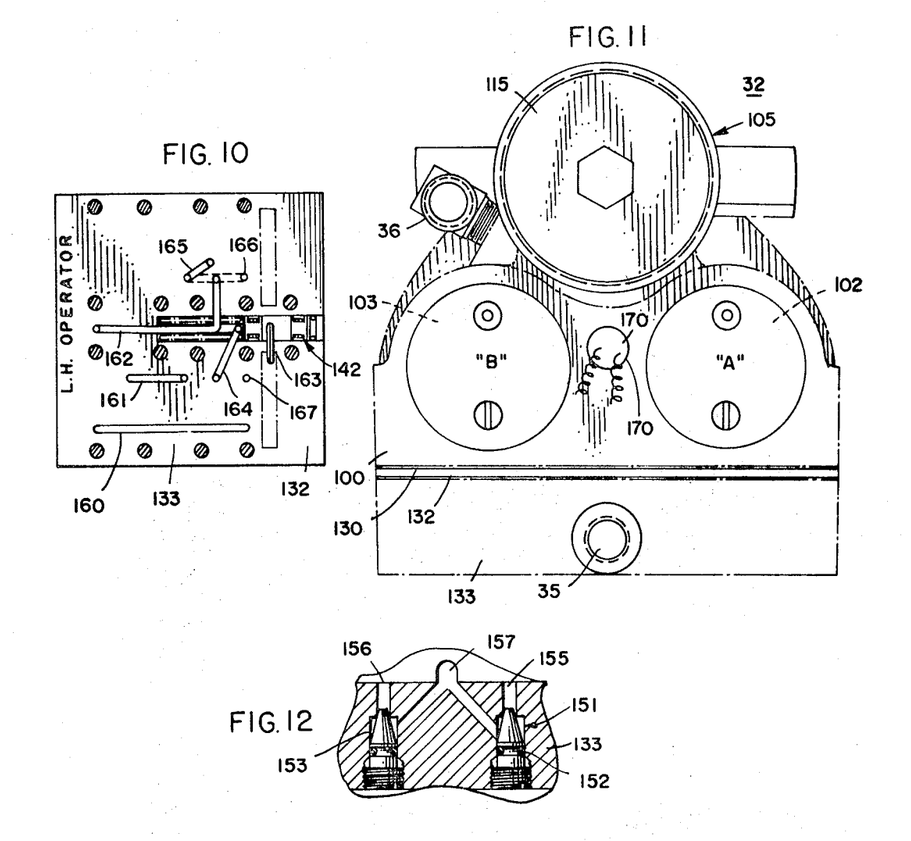
FIG. 10 illustrates the programming manifold plate of the door actuator of FIG. 8 which provides for left hand or right hand operation of the actuator.
FIG. 11 is an end view of the door actuator of FIG. 8.
FIG. 12 is a detail view of the porting of the throttle valves of the actuator of FIG. 8.
Figure 13:
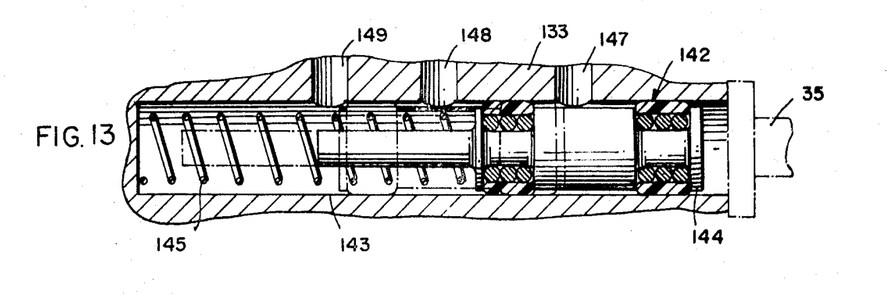
FIG. 13 is an enlarged view of the spool valve control of the actuator of FIG. 8.
Figure 14:
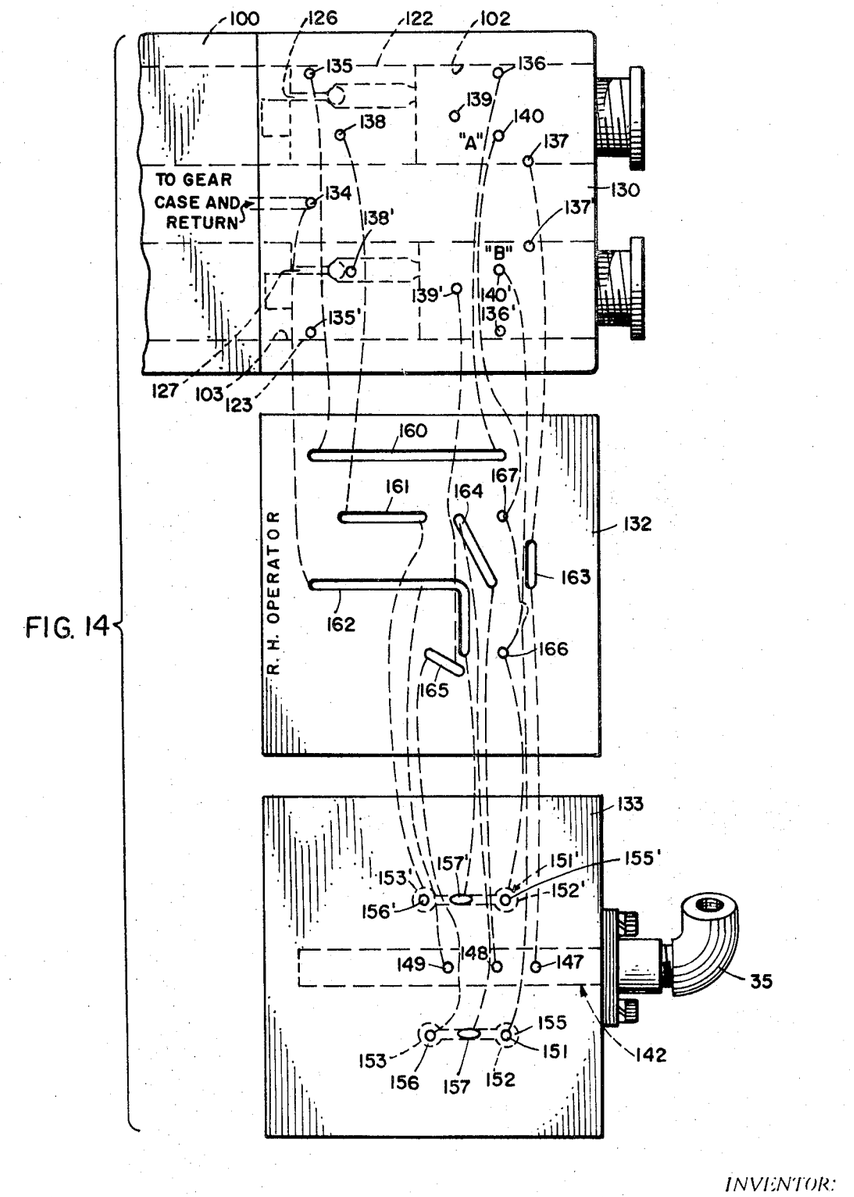
FIG. 14 is a fragmentary exploded view of the actuator of FIG. 8, illustrating the connection of ports and passageways by the operation selecting manifold plate.

As noted in FIGS. 10 and 14, the manifold plate 132 is provided with suitable passageways so as to interconnect ports from the port surface 130 and valve block 133 in a programmed manner to provide for left hand operation and right hand operation of the door. To this end the manifold plate 132 needs be merely reversed or turned over to modify or alter the operator from the left hand to the right hand operation.

Referring now to the ports in the port surface 130, there is provided an exhaust port 134, FIGS. 10 and 14, communicating with the gear case 104. The remaining ports from the port surface 130 all extend generally perpendicularly opening into the walls of the cylinders 102, 103 to be opened and closed by the travel of the pistons. The port surface 130 includes a first set of control ports 135 and 135' and a second set of control ports 136 and 136'. A set of inlet ports 137 and 137' is provided for the admission of fluid. Additionally there is a third set of control ports 138, 138', a fourth set 139, 139', and a fifth set 140, 140'. It is understood that in the normal operation of the door closer, only a portion of the ports 135 through 138 is used, depending on the left or right hand positioning of the manifold plate 132. The exact ports in use will be better understood in the discussion of FIGS. 15 through 19 in the section on actuator operation. However FIG. 14 illustrates in phantom the positioning of the pistons 122 and 123 when in their normal or at rest position. In this position it will be noticed that the ports 135 and 135', and 138 and 138' are both closed by the respective pistons 122 and 123. It will also be noticed that the gear end of the pistons 122 and 123 opens into the gear case 104. Moreover it will be understood that as one of the pistons moves away from the gear case 104, the other piston moves toward the gear case 104. The ports will be covered or uncovered in a sequence to perform the desired cycling of the door as hereinafter described.

To provide certain of the control functions of the door closer, the valve block 133 is provided with an inlet valve assembly 142 (FIG. 13) to control the admission of high pressure fluid to the proper hydraulic cylinder 102 or 103. More specifically the valve block 133 is provided with a bore 143 containing a spool valve 144. The spool valve 144 is biased by a compression spring 145 toward the open end of the bore 143. Moreover there is provided an inlet port 147 which is normally closed, but which is opened when pressurized fluid is admitted through the high pressure line 35. The high pressure fluid acts against the spool valve 144 to shift it to the left, as viewed in FIG. 13, so as to clear the inlet port 147. In addition there is provided a first control port 148 which is closed when the spool valve 144 has shifted to the left, as illustrated in phantom in FIG. 13, but which is in communication with a second control valve 149 when the spool valve 144 is in its normal position.

Additionally the valve block 133 contains suitable throttling valves to control the speed of operation of the actuator 32. More specifically there is provided two sets of throttling valves 151 and 151', FIGS. 12 and 14. Each set of throttling valves has a first and second needle valve 152, 152' and 153, 153'. Each of the needle valves 152, 152' and 153, 153' opens in a respective needle port 155, 155' and 156, 156'. In addition both of the needle valves 152, 153 and 152' and 153' connect to a single common port 157, 157' in the surface of the valve block.

The manifold plate 132 connects the suitable ports in the port surface 130 and the valve block 133 to provide the desired right or left hand operation. In the illustrated embodiment the manifold plate 132 is illustrated as providing the right hand operation. To this end there is provided a first elongated passageway 160 connecting the first and second ports 135 and 136. A second passageway 161 connects one of the needle ports 156' with the third port 138. An L-shaped passageway 162 connects one of the common ports 157' with the exhaust port 134. A fourth passageway 163 connects the inlet port 147 on the valve block 133 with an inlet port 137 on the port surface 130. A fifth passageway 164 connects the first control port 148 with the other of the common ports 157. A sixth passageway 165 connects another of the needle ports 156 with the port 139′ in the port surface 130. Moreover a first aperture 166 defining a seventh passageway provides communication between the needle port 155′ and the port 140′ while a second aperture 167 defining an eighth passageway provides communication between the needle valve 155 and the port 140.

It is understood that the above manifold plate position programs the right hand operator. If the manifold plate is turned over so that the working L.H. OPERATOR faces away from the port surface 130, then a left hand operator will be defined. When thus positioned it will be understood that the passageway 160 will interconnect the control ports 135′ and 136′. The second passageway 161 will connect the needle port 156 with the port 138′. The L-shaped passageway 162 will connect the common port 157 with the exhaust port 134. The fourth passageway 163 will connect the inlet port 147 with the inlet port 137′. The fifth passageway 164 will interconnect the first control port 148 with the common port 157′. The sixth passageway 165 will interconnect the needle port 156′ with the fourth port 139. The first aperture 166 will interconnect the needle port 155 with the fifth port 140 and the second aperture 167 will interconnect the needle port 155′ with the fifth port 140′.

An electric heater 170 (FIG. 11) maintains the desired fluid viscosity for cold weather operation.

ACTUATOR OPERATION

FIGS. 15 through 19 each illustrate the operation of the door closer through a different one of its operating cycles, namely the power opening cycle, the normal closing cycle, the panic opening (which is opening against the normal direction of operation), the panic closing, and the manual operation (opening of the door in the same direction as the power opening cycle). Moreover as herein illustrated, the operation of the door closer is programmed to provide for right hand power operation of the door. For purposes of convenience the opening piston during the power opening cycle has been designated as cylinder and piston A, while the opposite cylinder and piston has been designated B. It is understood as heretofore described that by reversal of the manifold plate 132 the door operator may be converted from a right hand operation to a left hand operation.

Figure 15:
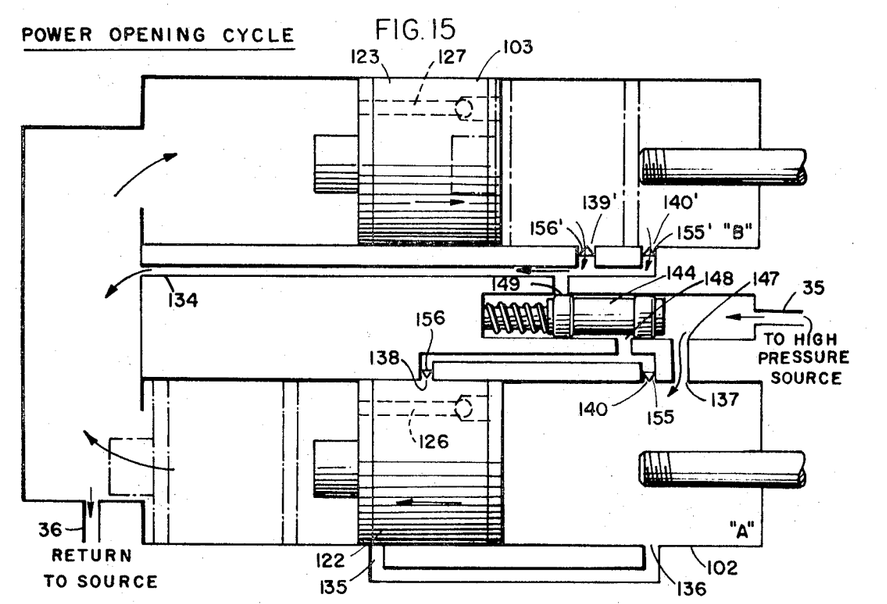
FIG. 15 is a schematic view of fluid flow in the actuator of FIG. 8 and illustrates a power opening cycle.

Referring now to the power opening cycle illustrated in FIG. 15, oil from the power pack is called for by the electrical control module to the control valve assembly 44 will come in through the high pressure line 35 to bear against the right hand side of the spool valve 144. The spool valve will shift to the left, to the position illustrated, so that oil can flow into the open end of cylinder A through the inlet port 137. The shifting of the spool valve 144 blocks communication of the flow as between the control ports 148 and 149. The oil in cylinder A causes driving motion of the piston 122. The motion of the racks and pinions causes opposing motion of the other piston 123 in cylinder B. This also causes rotation of the cam and compression of the return spring 114. The return spring operates from a preloaded condition. In a particular embodiment the spring 114 was preloaded at to approximately 500 pounds, and provided a compressive load of approximately 720 pounds at full open. As the piston 123 moves in cylinder B, it forces fluid through ports 139′ and 140′ past the needle valves 152′ and 153′. This oil passes through exhaust port 134 into the gear case 104 where it lubricates the mechanical components and can return to source through the return line 36. As the piston 123 moves in cylinder B it occludes ports 139′ and then oil must flow only through port 140′. The increased back pressure resulting in a decreased pressure differential slows down the door motion. Port 140′ and its needle valve 152′ control the final opening or cushion speed of the door. It is observed that valves 153′ and 152′, as well as valves 152 and 153, are independently adjustable without removing the door or covers to control the opening and cushioning speeds. The door motion is limited by impact of the piston against a screw stop. The door is held open by fluid pressure from the power pack. The power pack in the illustrated embodiment delivered oil at a nearly constant pressure of 800 p.s.i. As previously indicated a relief valve (not shown in FIG. 15) limits pressure buildup to approximately 1500 p.s.i. in the piston cavity.

During the hold-open, the door is held by fluid pressure on piston 122. The power pack maintains the pressure at approximately 800 p.s.i. The only fluid movement within the actuator during hold-open would be from leakage around piston 122. Within the limits of ordinary wear, operation will not be affected by changes in the fits in the pistons and cylinders.

The relief valve in the respective pistons also eliminates damage caused by excessive pressure in the piston cavity where there may be forceable interruption of the opening cycle or mis-adjustment of the speed control valves.

Figure 16:
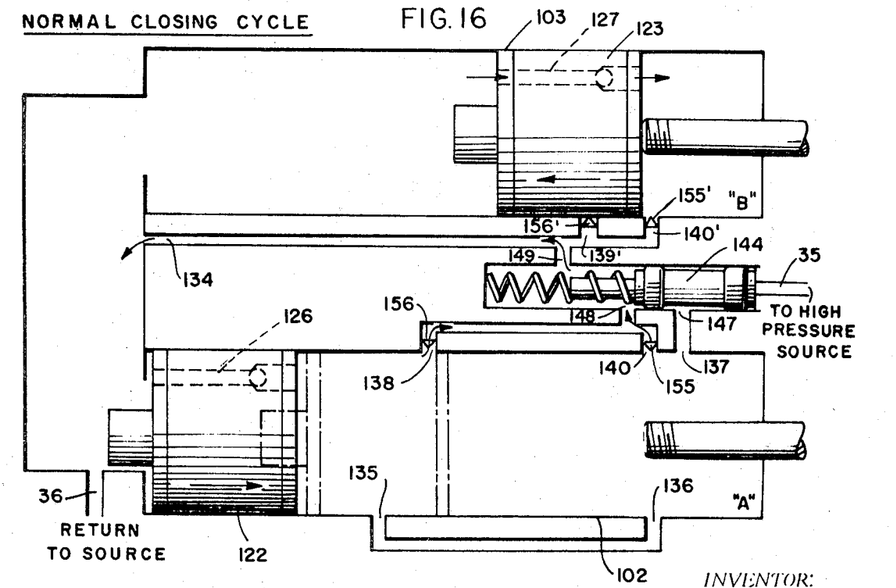
FIG. 16 is a schematic view of the fluid flow in the actuator of FIG. 8; and illustrates the normal closing cycle.

The normal closing cycle is illustrated in FIG. 16. As therein illustrated, when the door-open signal is removed, flow of fluid from the power pack is cut off by the solenoid valve assembly 44. The spool valve 144 is forced back to its original position by the influence of the spool valve spring 145. As the pressure in the cylinder drops, the return spring 114, acting through the door closing cam 110, causes the gear to rotate and the pistons 122 and 123 to move in the reverse or closing direction. Back flow of oil through the opening circuit channel is prevented during normal return operation by the return of the spool valve 144 to its original position as illustrated in FIG. 16. With the spool valve 144 in its original position, fluid will flow through port 149 to the gear case. From the gear case, fluid flows through the check valve 127 in piston 123 and into cylinder B. As the piston 122 advances, it occludes port 138, causing all fluid to pass through port 140. Valves at 138 and 140 are independently adjustable as herein described to regulate the closing and cushion speeds. As the door approaches its center or at rest position, the cam follower 112, propelled by the return spring, drops into the notch in the cam 110 and latches the door into its center position. During the entire operating cycle, all internal operating parts and all passages and valves are flooded with fluid. This provides continuous forced lubrication of all internal moving parts and eliminates lags in response to the controls.

Figure 17:
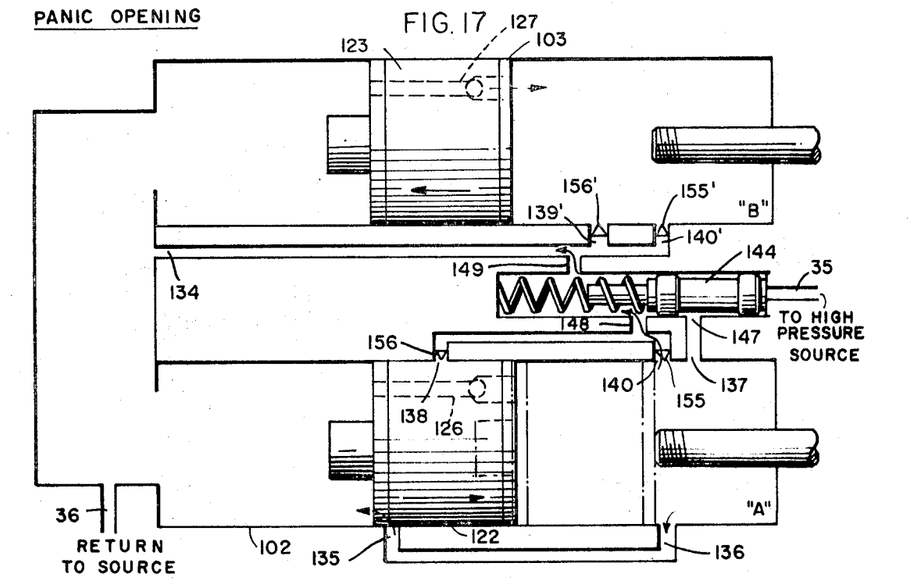
FIG. 17 is a schematic view of the fluid flow in the actuator of FIG. 8 and illustrates the panic opening cycle.

The panic opening cycle is illustrated in FIG. 17. As previously described the panic cycle is defined as manual operation of the actuator in the direction opposite to its normal powered operation regardless of whether the power is on or off.

With the door at its normal or at rest position, pistons 122, 123 are normally centered in their respective cylinders as illustrated in solid in FIG. 17. Operation of the door causes rotation of the pinion gear 108 and door closing cam 110, so as to compress the return compression spring 114. Moreover rotation of the pinion gear 108 causes advancement of the racks and pistons. Movement of piston 122 in cylinder A is initially resisted by the pressure sustained across the needle valve 152. This is the same needle valve that controls the cushion speed in the normal closing. However shortly after piston 1 begins its advance, the control port 135 is uncovered allowing free passage of fluid between ports 135 and 136 around the piston and into the gear case. According to the normal mat logic, a person making a panic exit with the power on would set the actuator into operation as soon as he stepped upon the active mat and off the safety mat. This is true in the present case in that the power pack would begin to pump fluid to the actuator as soon as the active mat is energized. However, because the position of the piston 122 at this time would be such as to permit free passage or flow of fluid between ports 136 and 135, this fluid would circulate freely without exerting any substantial force on the piston 122. The result would be a large flow of fluid through the actuator.

Simultaneously with the advance of piston 122 in cylinder A, the piston 123 in cylinder B moves toward the gear case, and fluid flows from the gear case through the ball check valve 127 in the piston 123 and into the cylinder B. Operation in this manner continues until the door is released or until the piston 122 bottoms against its adjusting stop.

Figure 18:
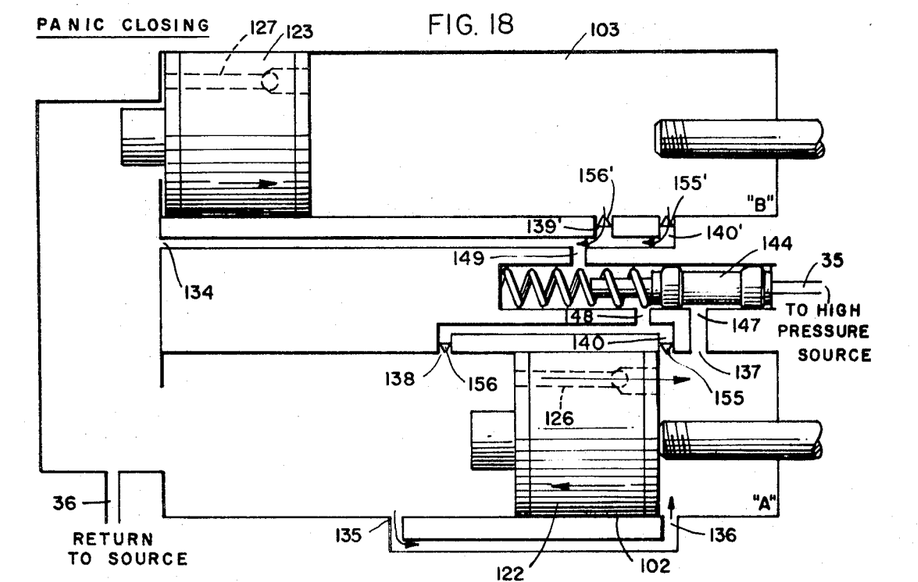
FIG. 18 is a schematic view illustrating the fluid flow in the actuator of FIG. 8 and illustrating the panic closing cycle.

The panic closing cycle is illustrated in FIG. 18. The closing spring 114 operating against the door closing cam 110 rotates the cam and gear, and causes the racks and pistons to move back toward the center position. As piston 122 moves toward the center position, fluid flows from the gear case through the check valve 126 in the piston 122 and into cylinder A. Simultaneously as the piston 123 in cylinder B moves toward the center position, fluid in cylinder B flows through ports 139' and 140', past needle valves 152' and 153' and returns to the gear case. Valves 152' and 153' are the same valves that empowered the normal manual operation to control the opening and opening cushion speeds of the door. This motion continues until the pistons 122 and 123 have returned to center position and the door is latched by the cam and cam follower in its closed position. Because closing panic motion is uncontrolled, the door may swing by inertia past center position. However such over travel will cause the door to return to center position under the same control as in the normal powered or manual operation.

If following panic opening a person should step on the active mat, the door will continue to close under spring power until piston 122 covers port 135. At this moment power operation will be resumed and the door will enter its normal power opening cycle. This power operation will taken place, in a particular embodiment, approximately 10 degrees of door rotation prior to the direction of normal opening.

Figure 19:
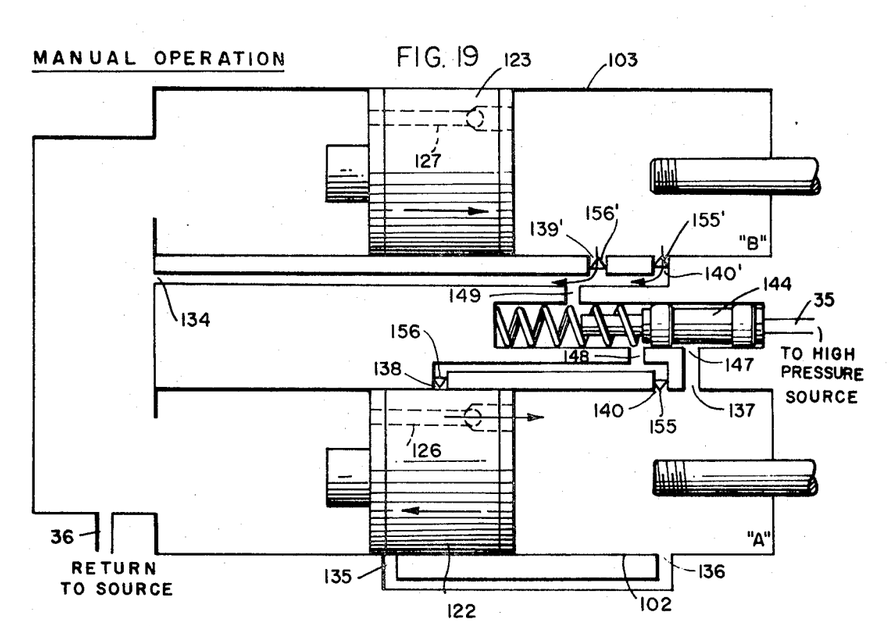
FIG. 19 is a schematic view illustrating the fluid flow in the actuator of FIG. 8 and illustrating manual operation of a door.

The manual operation cycle as previously defined is the manual opening with the power off, in the same direction as the normal power opening. Under these conditions, motion of the door causes rotation of the door closing cam 110 and consequent compression of the closing spring 114. Fluid in cylinder B follows the same route through ports 140' and 139' as in panic closing and as in normal power opening. The needle valve 153' controls the opening speed, along with needle valve 140', until port 139' is occluded by the piston 123, at which instance the speed of further opening comes under the sole control of needle valve 152'. In a particular embodiment this occurred at about 75 degrees of the normal opening direction. Simultaneously fluid is admitted from the gear case through the ball check valve 126 in piston 122 and into cylinder A, the same as in panic closing. This motion continues until the door is released, or until the piston 123 is arrested by its adjustable stop.

The closing from a manual operation cycle is the same as in the normal closing cycle following a power opening.

What is claimed as new and desired to be secured by Letters Patent of the United States is:

1. An automatic door operator comprising:
   a power pack including a fluid sump for returning fluid and a high pressure fluid source;
   valve means connected to said sump and said high pressure fluid source;
   electrical control module for sensing the presence of a person and controlling said valve means;
   an hydraulic door actuator connected to said valve means and including:
   an actuator housing assembly defining first and second hydraulic cylinders each closed at one end and opening into a gear case and each provided with a plurality of ports along their inner surface;
   first and second pistons in said first and second cylinders respectively intermediate the length of the respective cylinders when the door is in a closed position, each of said pistons having a check valve therethrough providing for unrestricted fluid flow toward the closed ends of the respective pistons;
   door spindle means extending into said gear case;
   means interconnecting each of said pistons with said door spindle means;
   said first cylinder having an inlet port adjacent its closed end, and a throttling port adjacent said closed end and another of which is closed by said piston when in a door closed position;
   said second cylinder having a throttling port adjacent its closed end;
   means responsive to a door opening signal from said control module for connecting said inlet port to said source of high pressure fluid through said valve means; and
   means effective in the absence of a door opening signal from said control module for connecting said throttling ports to said sump through said valve means.

2. An hydraulic door actuator comprising:
   an actuator housing assembly defining first and second hydraulic cylinders each closed at one end and opening into a gear case and each provided with a plurality of ports along their inner surface;
   first and second pistons in said first and second cylinders respectively intermediate the length of the respective cylinders when the door is in a closed position, each of said pistons having a check valve therethrough providing for unrestricted fluid flow toward the closed ends of the respective pistons;
   door spindle means extending into said gear case;
   means interconnecting each of said pistons with said door spindle means;
   said first cylinder having a first set of ports including an inlet port adjacent its closed end, and a throttling port adjacent said closed end and another of which is closed by said piston when in a door closed position;
   said second cylinder having a first set of ports including a throttling port adjacent its closed end and connected to a fluid return;
   means responsive to a door opening signal for connecting said inlet port to a source of high pressure fluid; and
   means effective in the absence of a door opening signal for connecting the first mentioned throttling port to a fluid return.

3. An hydraulic door actuator as set forth in claim 2 wherein said first cylinder additionally is provided with a second set of ports corresponding to the first mentioned set of ports of said second cylinder, and said second cylinder is additionally provided with a second set of ports corresponding to the first mentioned set of ports of said first cylinder; and means are provided for selectively rendering said first set of ports or said second set of ports effective to provide for right hand or left hand operation of said actuator.

4. An hydraulic door actuator comprising:
   an actuator housing assembly defining first and second hydraulic cylinders each closed at one end and opening into a gear case and each provided with a plurality of ports along their inner surface;
   first and second pistons in said first and second cylinders respectively intermediate the length of the respective cylinders when the door is in a closed position, each of said pistons having a check valve therethrough providing for unrestricted fluid flow toward the closed ends of the respective pistons;
   door spindle means extending into said gear case;
   means interconnecting each of said pistons with said door spindle means;
   said first cylinder having a first set of ports including an inlet port adjacent its closed end, and first and second interconnected throttling ports, one of which is adjacent said end and another of which is closed by said piston when in a door closed position, and a set of interconnected control ports, one of which is adjacent said closed end and the other of which is closed by said piston when in a door closed position;

said second cylinder having a first set of ports including a pair of interconnected throttling ports, one of which is adjacent said closed end, and the other of which is spaced inwardly from said closed end to be blocked by said piston when said piston approaches said closed end, said pair of throttling ports being connected to a fluid return; and means responsive to a door opening signal for connecting said inlet port to a source of high pressure fluid; and means effective in the absence of a door opening signal for connecting the first mentioned set of throttling ports to a fluid return.

5. An hydraulic door actuator as set forth in claim 4 wherein said first cylinder additionally is provided with a second set of ports corresponding to the first mentioned set of ports of said second cylinder, and said second cylinder is additionally provided with a second set of ports corresponding to the first mentioned set of ports of said first cylinder; and means are provided for selectively rendering said first set of ports or said second set of ports effective to provide for right hand or left hand operation of said actuator.

6. An hydraulic door actuator as set forth in claim 4 wherein the last two mentioned means comprises a valve means movable between a first position placing each set of throttling valves in communication with a fluid return to a second position for placing said inlet port in communication with a high pressure fluid source.

7. An hydraulic door actuator as set forth in claim 6 wherein said valve means comprises a spool type valve including a valve body defining a valve cylinder closed at one end and having inlet means at its other end for connection to a high pressure fluid source, a spool valve in said valve cylinder biased toward said other end, a port in said valve cylinder connecting with said inlet port normally closed by said pool valve and communicating with said inlet means when said spool valve is shifted by the presence of a high pressure fluid against its return bias, a second port in said valve cylinder communicating with said first set of throttling valves and a third port in said valve cylinder communicating with said fluid return, said second and third ports normally being in communication and being blocked by said spool valve when said spool valve is in said shifted position.

8. An hydraulic door actuator as set forth in claim 4 and including door closing means.

9. An hydraulic door actuator as set forth in claim 4 and including means for heating the operating fluid in said actuator.

10. An hydraulic door actuator as set forth in claim 5 wherein said housing assembly includes:

a cylinder housing member having a port surface, said ports of said first and second cylinders each opening as ports onto said port surface;

a valve block containing said last two mentioned means and additionally containing throttling valve for connection to said throttling ports and including a port surface provided with ports confronting the first mentioned port surface; and a manifold plate sandwiched between said port surfaces interconnecting ports thereof, said manifold being positioned in a first position to render said first set of ports operative and in a second position by the mere reversal thereof to render said second set of ports operative, thereby to provide selectively for right hand or left hand operation of said actuator.

11. An hydraulic door actuator comprising:
cylinder assembly means;
piston means in said cylinder assembly means;
a first set of ports in said cylinder assembly means providing for right hand operation of said door actuator;
a second set of ports in said cylinder assembly means providing for left hand operation of said door actuator;
passage means in said cylinder assembly means selectively programming said actuator for right or left hand operation and including a manifold plate; and means including said manifold plate selectively rendering one of said sets of ports effective to selectively provide for right hand or left hand operation of said actuator by the mere reversal of said manifold plate relative to said cylinder assembly means.

References Cited
UNITED STATES PATENTS

| | | | |
|---|---|---|---|
| 1,993,612 | 3/1935 | Lum | 60—52 US UX |
| 1,998,103 | 4/1935 | Smith | 60—52 CO |
| 2,382,437 | 8/1945 | Molly | 60—51 UX |
| 3,026,676 | 3/1962 | Wenzel et al. | 60—52 CO |
| 3,084,927 | 4/1963 | Linder | 60—51 X |
| 3,195,879 | 7/1965 | Bond et al. | 60—52 CO X |
| 2,510,632 | 6/1950 | Hemphill | 60—52 US UX |

EDGAR W. GEOGHEGAN, Primary Examiner

U.S. Cl. X.R.

60—52 CD